(12) United States Patent
Josefy

(10) Patent No.: US 11,440,602 B2
(45) Date of Patent: Sep. 13, 2022

(54) UTILITY TRAILER ASSEMBLY

(71) Applicant: Timothy Josefy, Oklahoma City, OK (US)

(72) Inventor: Timothy Josefy, Oklahoma City, OK (US)

( * ) Notice: Subject to any disclaimer, the term of this patent is extended or adjusted under 35 U.S.C. 154(b) by 489 days.

(21) Appl. No.: 16/745,113

(22) Filed: Jan. 16, 2020

(65) Prior Publication Data
US 2020/0223502 A1     Jul. 16, 2020

Related U.S. Application Data

(60) Provisional application No. 62/793,115, filed on Jan. 16, 2019.

(51) Int. Cl.
| | |
|---|---|
| *B62D 63/06* | (2006.01) |
| *B62D 25/20* | (2006.01) |
| *B60P 3/025* | (2006.01) |

(52) U.S. Cl.
CPC ......... *B62D 63/061* (2013.01); *B62D 25/209* (2013.01); *B60P 3/0257* (2013.01)

(58) Field of Classification Search
CPC ............................ B62D 63/061; B62D 25/209
See application file for complete search history.

(56) References Cited

U.S. PATENT DOCUMENTS

| | | | |
|---|---|---|---|
| 3,582,131 A * | 6/1971 | Brown | B60P 3/34 296/26.02 |
| 4,515,394 A | 5/1985 | Zwick | |
| 5,221,100 A | 6/1993 | McNutt | |
| 5,310,209 A * | 5/1994 | Holman | B60P 3/0255 280/43.1 |
| 6,283,537 B1 | 9/2001 | DeVore, III | |
| 6,416,101 B1 | 7/2002 | Bartch | |
| 6,739,617 B1 * | 5/2004 | Martin | B60P 3/341 280/789 |
| 7,527,279 B1 | 5/2009 | McCalip | |
| 8,388,017 B2 | 3/2013 | Alexander | |
| 8,465,085 B1 * | 6/2013 | Tradup | B62D 63/061 296/186.4 |
| 2011/0204601 A1 * | 8/2011 | Alvarino | B62D 63/062 280/656 |
| 2013/0160755 A1 * | 6/2013 | Amat I. Pujol | B60P 3/0257 126/4 |
| 2017/0341562 A1 | 11/2017 | Knight | |

FOREIGN PATENT DOCUMENTS

ES     1013667     1/1991

\* cited by examiner

*Primary Examiner* — Jacob D Knutson
(74) *Attorney, Agent, or Firm* — McAfee & Taft

(57) ABSTRACT

Disclosed is a utility trailer assembly capable of transitioning between a towing position and a utility position. The tow position allows for efficient transportation of the utility trailer assembly to and from various locations. In the utility position, the utility trailer assembly provides access to a plurality of storage and multi-use areas and compartments.

20 Claims, 7 Drawing Sheets

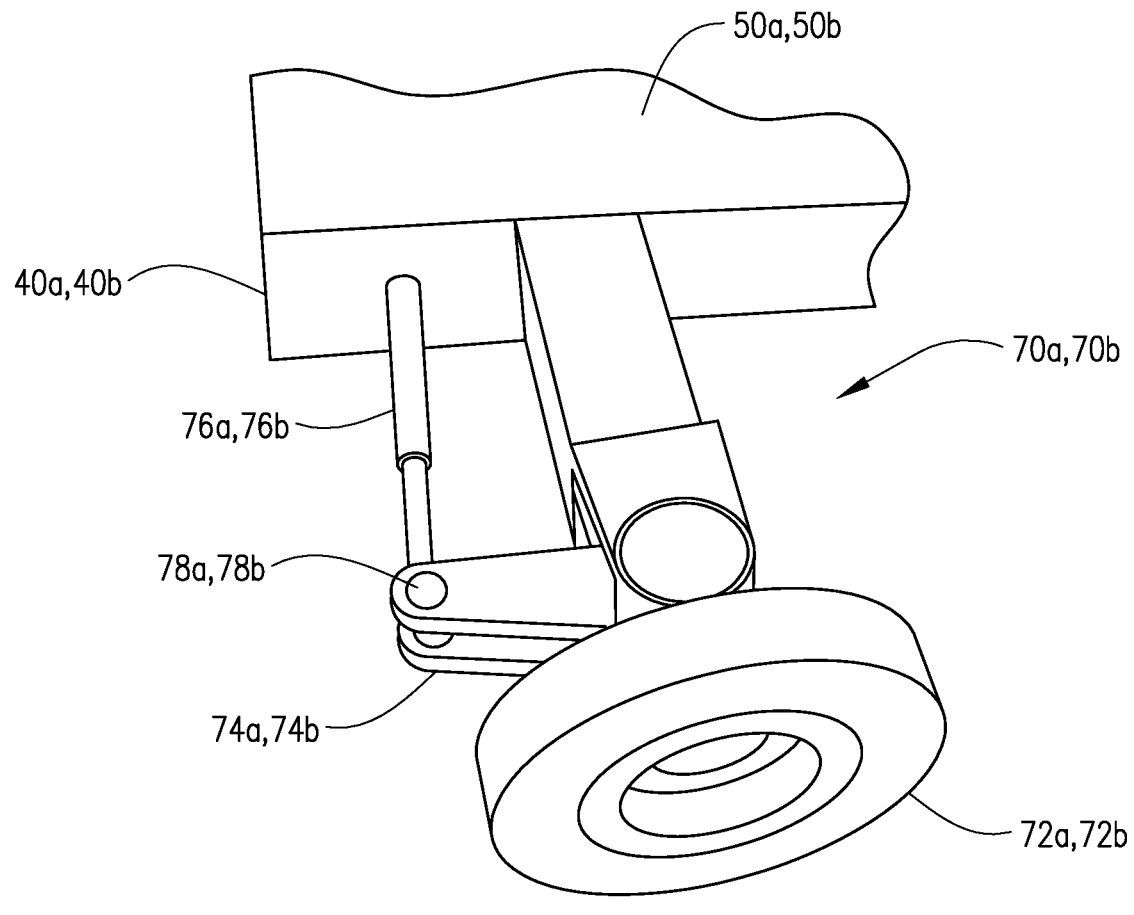
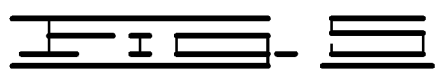

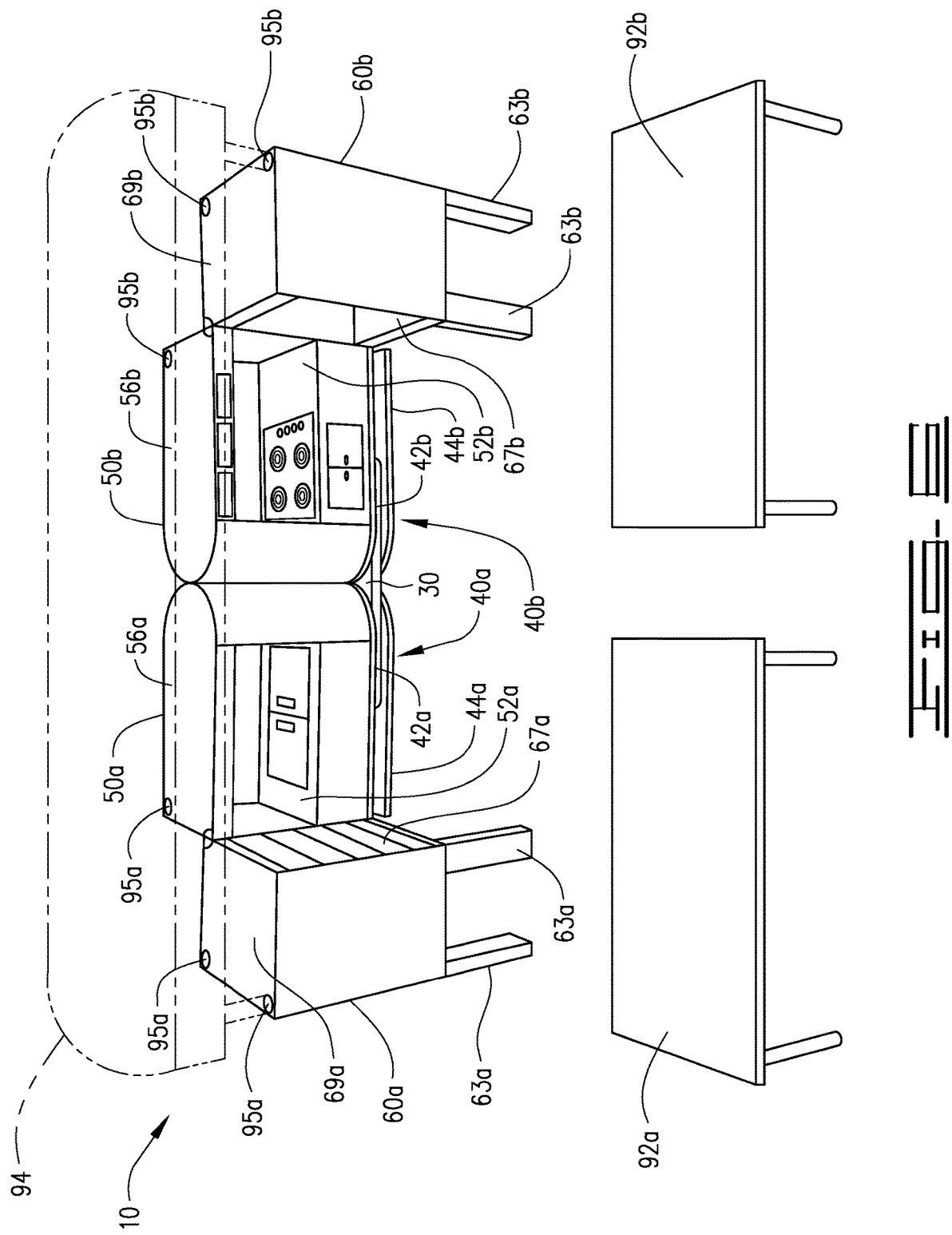

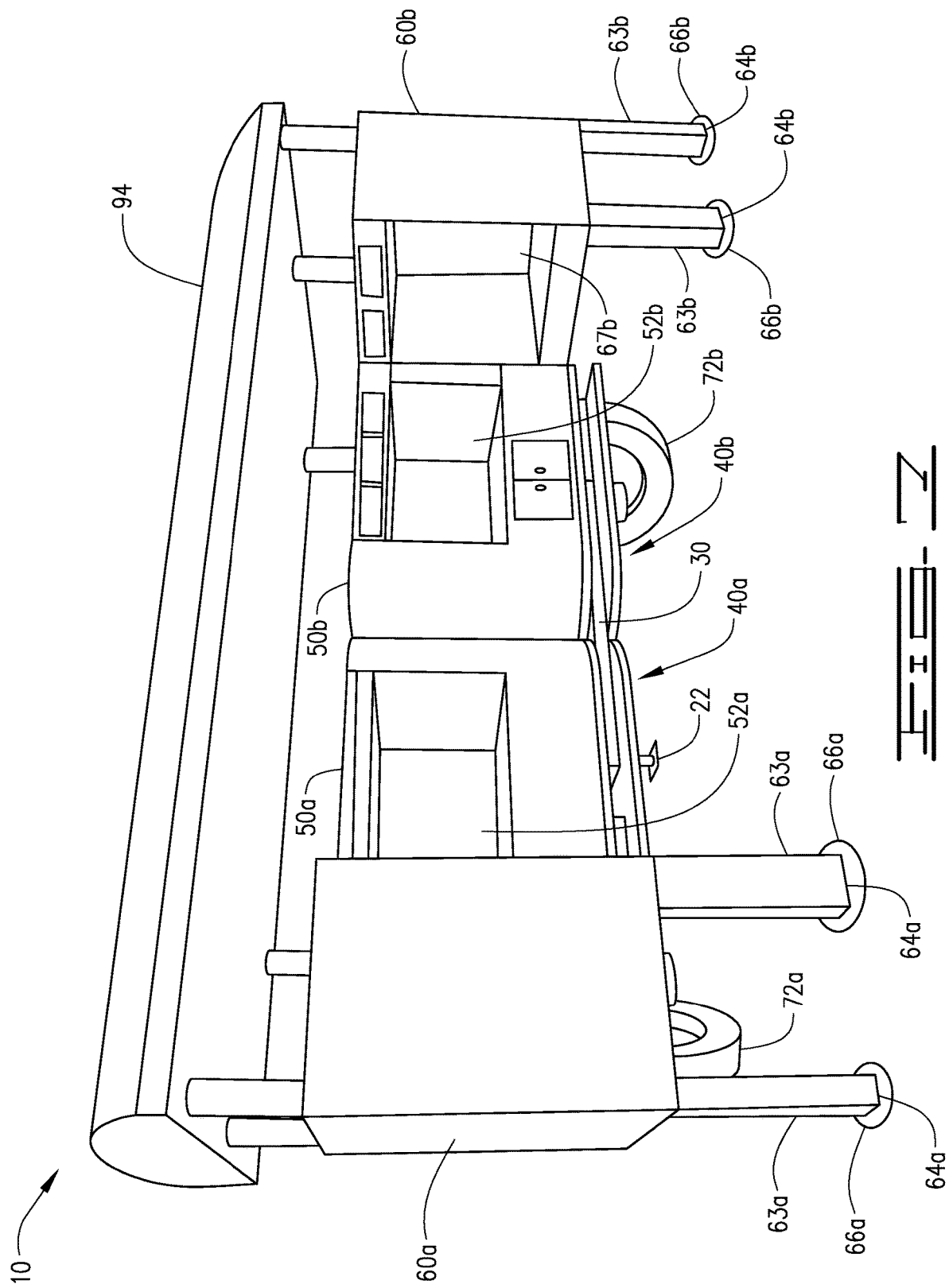

UTILITY TRAILER ASSEMBLY

CROSS REFERENCE TO RELATED APPLICATION

The present application claims priority to U.S. Provisional Application No. 62/793,115 filed on Jan. 16, 2019, which is incorporated herein by reference.

TECHNICAL FIELD

The present disclosure relates generally to trailer assemblies, and more specifically, to a service trailer configured to transport various goods and equipment.

BACKGROUND

In the vendor and craft service industry, to provide services on-location for an event, television shoot, or movie shoot, craft service personnel ("Craftys") transport various goods and equipment to the on-location site. These goods and equipment include tables, food, beverages, and equipment for preparing and serving the same such as burners, pots, pans, etc. Common practice for Craftys is to either load and unload their personal vehicles or tow large, enclosed trailers, each of which has its disadvantages. The personal vehicles require the tedious process of numerous trips back and forth from the vehicles to the on-location site. The large, enclosed trailers tend to be cumbersome in tight locations and lack fuel efficiency when moving from one location to another. Thus, moving the large, enclosed trailers from one location to the next can prove costly and time-consuming. Therefore, there is a need for a trailer assembly that is lightweight, agile, and fuel efficient, and one that requires minimal set up and tear down time, which, in turn, reduces the overall cost of moving from one location to the next.

SUMMARY

The present invention provides a trailer assembly which overcomes the deficiencies described above, and has other advantages.

In one embodiment, a trailer assembly is provided. The trailer assembly comprises a trailer, a hitch assembly projecting outward from a base, a left swivel plate, a right swivel plate, a left inner module, a right inner module, a left outer module, a right outer module, a left axle assembly, and a right axle assembly. The trailer has a utility position and a tow position. The left swivel plate and the right swivel plate pivotally mount to the base and have an opened position and a closed position. The left swivel plate carries the left inner module such that the left inner module pivots with the left swivel plate when the left swivel plate is moved between the opened position and the closed position. The right swivel plate carries the right inner module such that the right inner module pivots with the right swivel plate when the right swivel plate is moved between the opened position and the closed position. The left outer module pivotally connects to the left inner module and the right outer module pivotally connects to the right inner module.

The left axle assembly connects to the left swivel plate and moves between a rolling position and an angled position. The rolling position prevents movement of the left swivel plate and the angled position allows movement of the left swivel plate between the opened position and the closed position. The left axle assembly comprises a left wheel assembly and a left actuator. The left actuator provides for actuation of the left wheel assembly. Actuation of the left wheel assembly allows the left axle assembly to move between the rolling position and the angled position.

The right axle assembly connects to the right swivel plate and moves between a rolling position and an angled position. The rolling position prevents movement of the right swivel plate and the angled position allows movement of the right swivel plate between the opened position and the closed position. The right axle assembly comprises a right wheel assembly and a right actuator. The right actuator provides for actuation of the right wheel assembly. Actuation of the right wheel assembly allows the right axle assembly to move between the rolling position and the angled position.

In some embodiments, the trailer assembly further comprises one or more compartments within the left inner module, one or more compartments within the left outer module, one or more compartments within the right inner module, and one or more compartments within the right outer module. The one or more compartments within the left inner module and one or more compartments within the left outer module are accessible when the left swivel plate is in the opened position. The one or more compartments within the right inner module and the one or more compartments within the right outer module are accessible when the right swivel plate is in the opened position.

In another embodiment, the trailer assembly further comprises a first recessed hinge and a second recessed hinge. The first recessed hinge provides the pivotal connection between the left inner module and the left outer module to allow movement of the left outer module from a first position to a second position relative to the left inner module. In the first position, the left outer module shares a common longitudinal axis with the left inner module for when the trailer assembly is in the tow position. In the second position, the left outer module is askew to the left inner module when the trailer assembly is in the utility position. The second recessed hinge provides the pivotal connection between the right inner module and the right outer module to allow movement of the right outer module from a first position to a second position relative to the right inner module. In the first position, the right outer module shares a common longitudinal axis with the right inner module for when the trailer assembly is in the tow position. In the second position, the right outer module is askew to the right inner module when the trailer assembly is in the utility position.

BRIEF DESCRIPTION OF THE DRAWINGS

The drawings included with this application illustrate certain aspects of the embodiments described herein. However, the drawings should not be viewed as exclusive embodiments. The subject matter disclosed is capable of considerable modifications, alterations, combinations, and equivalents in form and function, as will occur to those skilled in the art with the benefit of this disclosure.

FIG. 5 is a perspective view of an axle assembly, actuator mount, and actuator in accordance with one embodiment of the present disclosure.

FIG. 6 is a perspective view of a trailer assembly in the utility position in accordance with one embodiment of the present disclosure.

FIG. 7 is a perspective view of a trailer assembly in the utility position and showing the canopy embodiment in accordance with one embodiment of the present disclosure.

DETAILED DESCRIPTION

Figure 1:
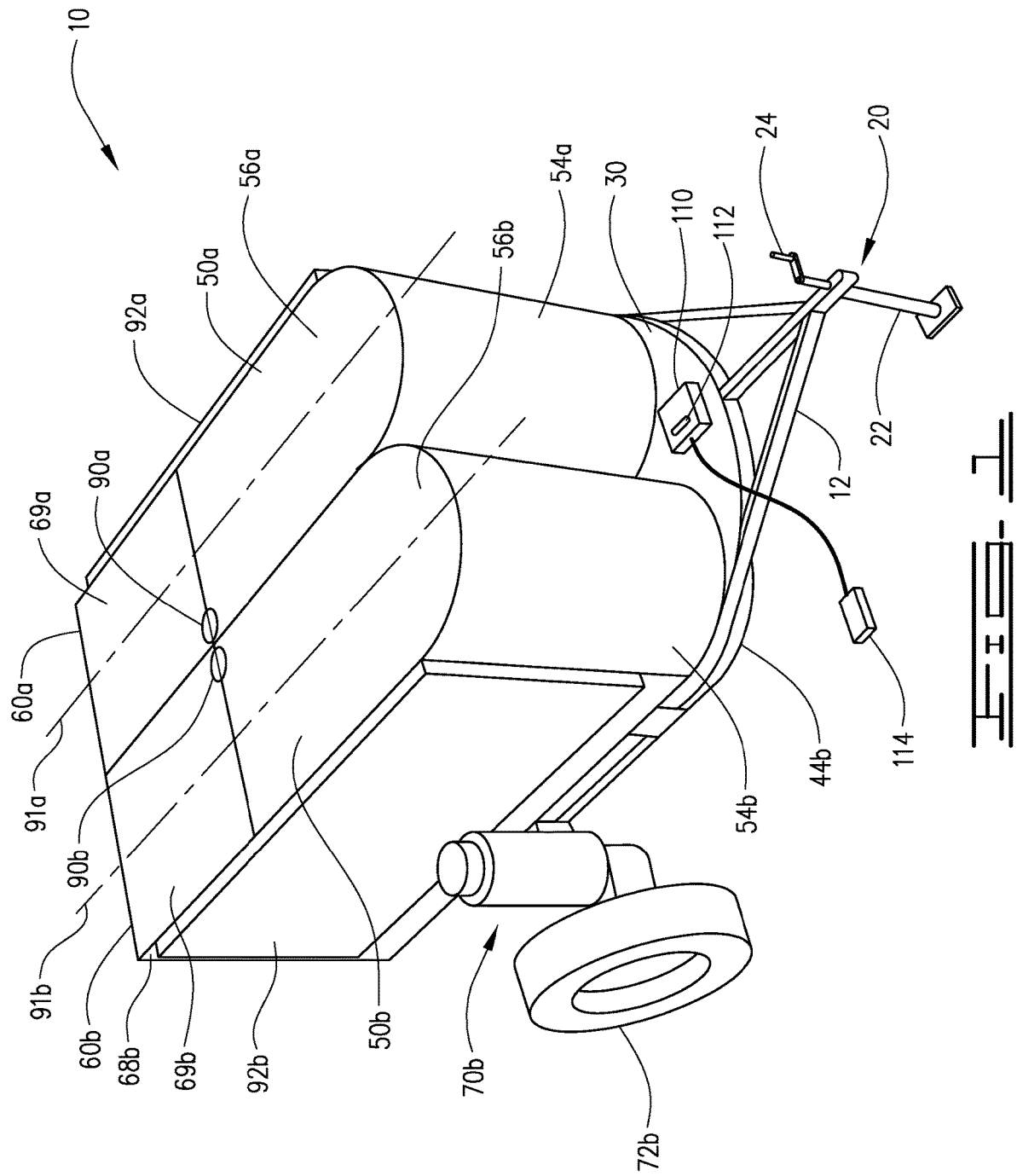
FIG. 1 is a top front perspective view of a trailer assembly in the tow position in accordance with one embodiment of the present disclosure.

The present disclosure may be understood more readily by reference to these detailed descriptions. For simplicity and clarity of illustration, where appropriate, reference numerals may be repeated among the different figures to indicate corresponding or analogous elements. In addition, numerous specific details are set forth in order to provide a thorough understanding of the various embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Figure 2:
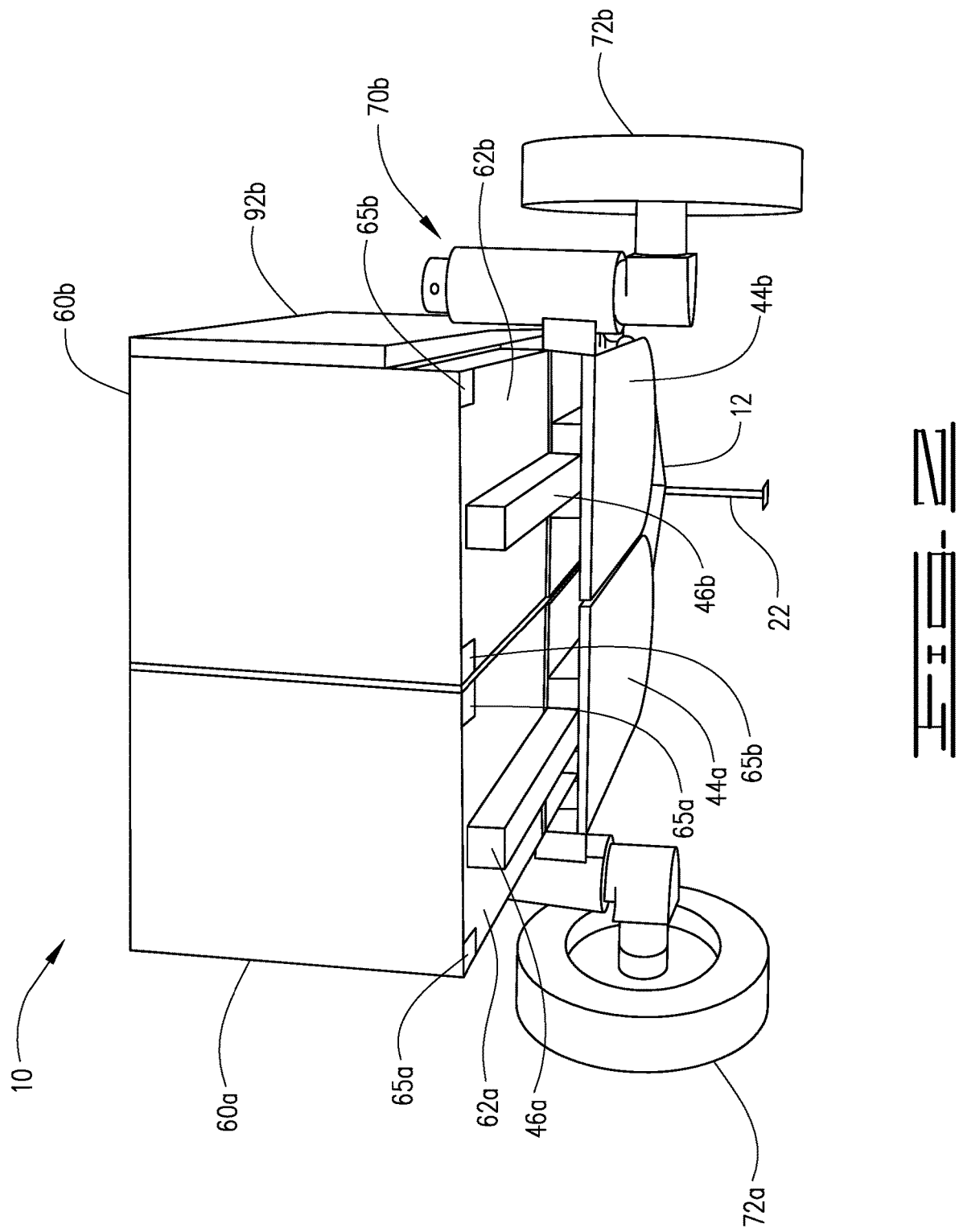
FIG. 2 is a bottom back perspective view of a trailer assembly in the tow position in accordance with one embodiment of the present disclosure.
Figure 3:
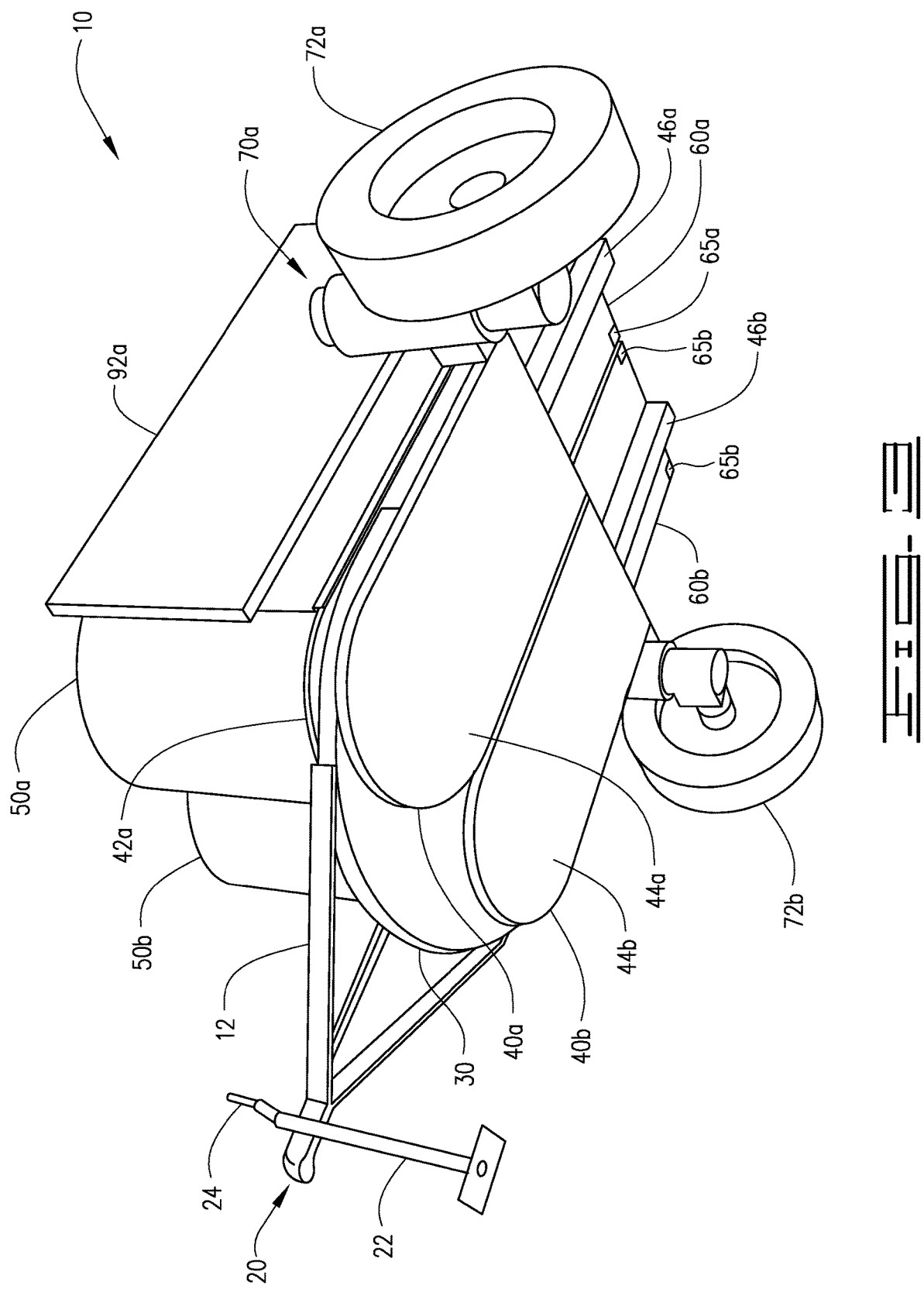
FIG. 3 is a bottom front perspective view of a trailer assembly in the tow position in accordance with one embodiment of the present disclosure.
Figure 4:
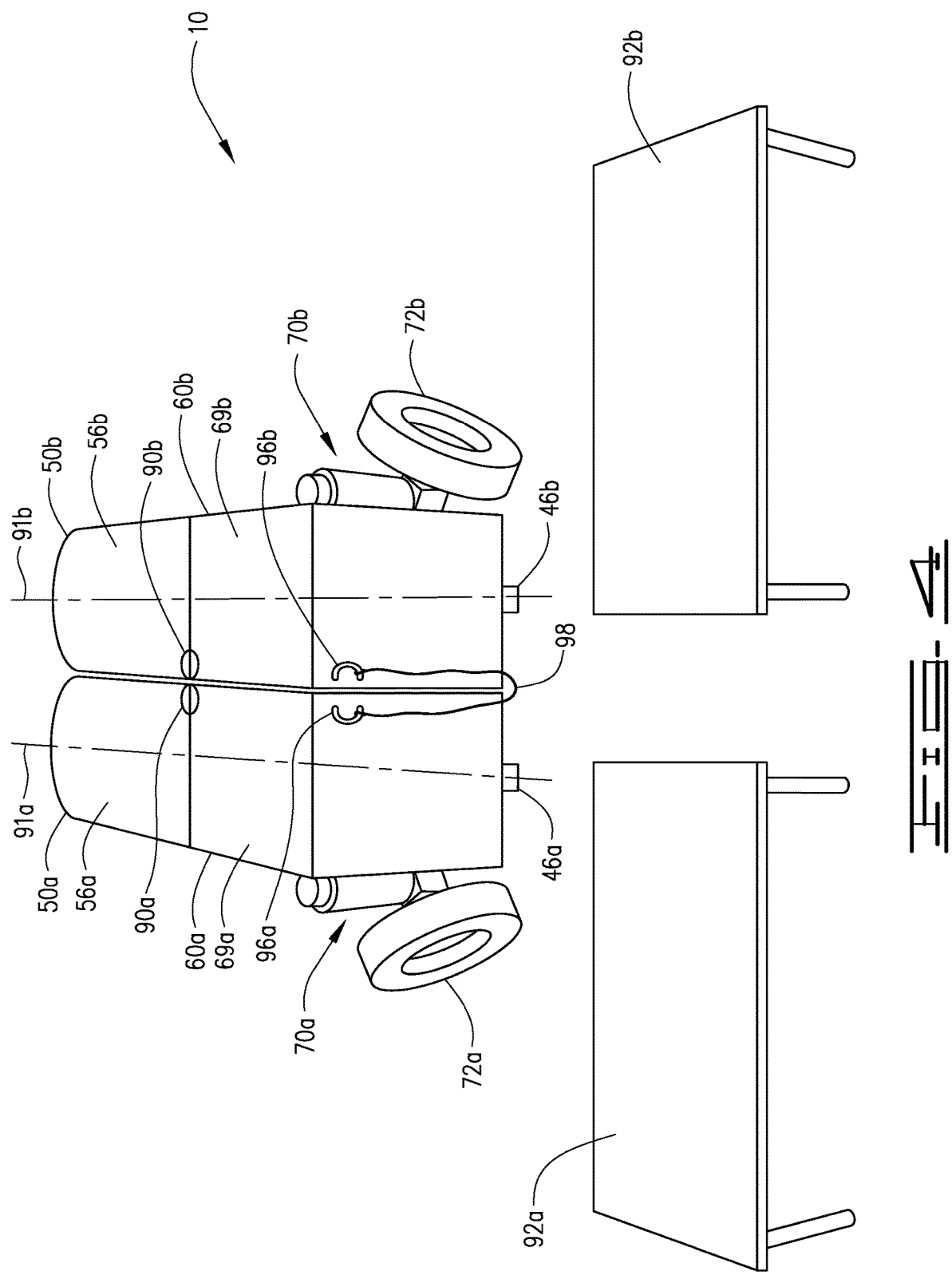
FIG. 4 is a top rear perspective view of a trailer assembly in transition between the tow position and the utility position and showing the snap ring embodiment in accordance with one embodiment of the present disclosure.

Referring now to FIGS. 1-7 generally, the trailer assembly in accordance with the present disclosure is illustrated and generally designated by the numeral 10. With reference to FIGS. 1-3, the general form of trailer assembly 10 includes a trailer 12, a hitch assembly 20, a left swivel plate 40*a*, a right swivel plate 40*b*, a left inner module 50*a*, a right inner module 50*b*, a left outer module 60*a*, a right outer module 60*b*, a left axle assembly 70*a*, and a right axle assembly 70*b*. Trailer 12 has a utility position, as depicted in FIGS. 6-7, and a tow, or closed, position, as depicted in FIGS. 1-3. FIG. 4 shows trailer 12 in transition between the utility position and the tow position.

As shown by FIGS. 1-3, the tow position, of trailer 12 allows for efficient transportation of trailer assembly 10 to and from on-location sites for various events, including, without limitation, television shoots and movie shoots. As shown by FIGS. 6-7, the utility position of trailer 12 allows for access to one or more compartments 52*a* of left inner module 50*a*, one or more compartments 52*b* of right inner module 50*b*, one or more compartments 67*a* of left outer module 60*a*, and one or more compartments 67*b* of right outer module 60*b*. Compartments 52*a*, 52*b*, 67*a*, and 67*b* are equipped with various wears, goods, and equipment including, without limitation, drawers, shelves, and kitchen equipment such as stoves, grills, refrigerators, and freezers. One of ordinary skill in the art will understand that compartments 52*a*, 52*b*, 67*a*, and 67*b* may be modified and adapted to fit the specific needs of a particular on-location site. While trailer 12 is in the tow position, compartments 52*a*, 52*b*, 67*a*, and 67*b* allow for easy storage and transport of such wears, goods, and equipment to and from on-location sites and between various on-location sites.

Hitch assembly 20 projects from a base 30. In some embodiments, hitch assembly 20 provides for connection of trailer 12 to a vehicle, not shown. In other embodiments, not shown, trailer 12 adapts to be a stand alone front wheel drive vehicle or integrated with a car. In additional embodiments, hitch assembly 20 includes a telescoping support arm 22. Telescoping support arm 22 moves between a first position and a second position. In the first position, as shown in FIGS. 1-3, telescoping support arm 22 has a length sufficient to contact a ground surface to level and stabilize trailer 12 on the ground surface. In the second position, telescoping support arm 22 does not contact the ground surface. The second position of telescoping support arm 22 allows for transport of trailer 12. In other embodiments, hitch assembly 20 includes a handle 24. Handle 24 connects to telescoping support arm 22 such that manipulation of handle 24 causes telescoping support arm 22 to move between the first position and the second position. For example, manipulation of handle 24 may be circular rotation. In other embodiments, movement of telescoping support arm 22 between the first position and the second position is electrically powered. One of ordinary skill will understand that any known electrical power source capable of manipulating telescoping support arm 22 from the first position to the second position may be used.

Left swivel plate 40*a* pivotally mounts to base 30 and has an opened position, as depicted in FIGS. 6-7, and a closed position, as depicted in FIGS. 1-4. The opened position allows access to compartments 52*a* and compartments 67*a* while trailer 12 is in the utility position. The closed position allows for transport of trailer 12 to, from, and between on-location sites while trailer 12 is in the tow position. In some embodiments, left swivel plate 40*a* includes a first upper plate 42*a* and a first lower plate 44*a*. In such embodiments, base 30 secures between first upper plate 42*a* and first lower plate 44*a*. First upper plate 42*a* and first lower plate 44*a* provide additional weight and balance for trailer 12.

Right swivel plate 40*b* pivotally mounts to base 30 and has an opened position, as depicted in FIGS. 6-7, and a closed position, as depicted in FIGS. 1-4. The opened position allows access to compartments 52*b* and compartments 67*b* while trailer 12 is in the utility position. The closed position allows for transport of trailer 12 to, from, and between on-location sites while trailer 12 is in the tow position. In some embodiments, right swivel plate 40*b* includes a first upper plate 42*a* and a first lower plate 44*a*. In such embodiments, base 30 secures between second upper plate 42*b* and second lower plate 44*b*. First upper plate 42*a* and first lower plate 44*a* provide additional weight and balance for trailer 12.

Left swivel plate 40*a* carries left inner module 50*a* such that left inner module 50*a* pivots with left swivel plate 40*a* when left swivel plate 40*a* moves between the opened position and the closed position. Such configuration allows access to compartments 52*a* of left inner module 50*a*. Right swivel plate 40*b* carries right inner module 50*b* such that right inner module 50*b* pivots with right swivel plate 40*b* when right swivel plate 40*b* moves between the opened position and the closed position. Such configuration allows access to compartments 52*b* of right inner module 50*b*.

Left outer module 60*a* pivotally connects to left inner module 50*a*. In some embodiments, a first recessed hinge 90*a* provides the pivotal connection between left inner module 50*a* and left outer module 60*a*. First recessed hinge 90*a* allows movement of left outer module 60*a* from a first position to a second position relative to left inner module 50*a*. In the first position, as more specifically shown in FIGS. 1 and 4, left outer module 60*a* shares a common longitudinal axis, or plane, 91*a* with left inner module 50*a*. The first position corresponds to the tow position of trailer 12. In the second position, as shown in FIGS. 6 and 7, left outer module 60a is askew to left inner module 50a. The second position corresponds to the utility position of trailer 12.

Right outer module 60b pivotally connects to right inner module 50b. In some embodiments, a second recessed hinge 90b provides the pivotal connection between right inner module 50b and right outer module 60b. Second recessed hinge 90b allows movement of right outer module 60b from a first position to a second position relative to right inner module 50b. In the first position, as more specifically shown in FIGS. 1 and 4, right outer module 60b shares a common longitudinal axis, or plane 91b with right inner module 50b. The first position corresponds to the tow position of trailer 12. In the second position, as shown in FIGS. 6 and 7, right outer module 60b is askew to right inner module 50b. The second position corresponds to the utility position of trailer 12.

In some embodiments, left swivel plate 40a includes a left support beam 46a secured between left swivel plate 40a and left inner module 50a. In embodiments including first upper plate 42a and first lower plate 44a, left support beam 46a secures between first upper plate 42a and first lower plate 44a. Such configuration creates a cavity between first upper plate 42a and first lower plate 44a that can be used for additional storage on trailer 12. Left support beam 46a has a retracted position and an extended position. In the extended position, left support beam 46a engages left outer module 60a to provide additional bracing and support of left outer module 60a while trailer 12 is in the tow position.

In some embodiments, right swivel plate 40b includes a right support beam 46b secured between right swivel plate 40b and right inner module 50b. In embodiments including second upper plate 42b and second lower plate 44b, right support beam 46b secures between second upper plate 42b and second lower plate 44b. Such configuration creates a cavity between second upper plate 42b and second lower plate 44b that can be used for additional storage on trailer 12. Right support beam 46b has a retracted position and an extended position. In the extended position, right support beam 46b engages right outer module 60b to provide additional bracing and support of right outer module 60b while trailer 12 is in the tow position.

In other embodiments, as depicted in FIGS. 6 and 7, left outer module 60a includes one or more support legs 63a. Support legs 63a are secured and positioned at a bottom surface 62a of left outer module 60a. Support legs 63a move between an extended position and a retracted position. In the extended position, support legs 63a have a length sufficient to contact a ground surface. As shown in FIGS. 6 and 7, when trailer 12 is in the utility position, and left swivel plate 40a is in the opened position, support legs 63a extend down from bottom surface 62a of left outer module 60a to engage the ground surface. Support legs 63a are adjustable to help level and stabilize trailer 12 at the on-location site while trailer 12 is in the utility position.

In some embodiments, left outer module includes one or more receiving slots 65a in bottom surface 62a. Receiving slots 65a receive and retain support legs 63a when support legs 63a are in the retracted position. In additional embodiments, one or more support legs 63a include a first set of one or more coasters 66a. First set of one or more coasters 66a secure to a bottom surface 64a of one or more supports legs 63a. With support legs 63a in the extended position, coasters 66a engage the ground surface and allow easier movement of the left outer module 60a along the ground surface. For example, coasters 66a allow for smooth, efficient movement of left outer module 60a along the ground surface when moving trailer 12 between the tow position and the utility position.

In other embodiments, as depicted in FIGS. 6 and 7, right outer module 60b includes one or more support legs 63b. Support legs 63b are secured and positioned at a bottom surface 62b of right outer module 60b. Support legs 63b move between an extended position and a retracted position. In the extended position, support legs 63b have a length sufficient to contact a ground surface. As shown in FIGS. 6 and 7, when trailer 12 is in the utility position, and right swivel plate 40b is in the opened position, support legs 63b extend down from bottom surface 62b of right outer module 60b to engage the ground surface. Support legs 63b are adjustable to help level and stabilize trailer 12 at the on-location site while trailer 12 is in the utility position.

In some embodiments, right outer module includes one or more receiving slots 65b in bottom surface 62b. Receiving slots 65b receive and retain support legs 63b when support legs 63b are in the retracted position. In additional embodiments, one or more support legs 63b include a second set of one or more coasters 66b. Second set of one or more coasters 66b secure to a bottom surface 64b of one or more supports legs 63b. With support legs 63b in the extended position, coasters 66b engage the ground and allow easier movement of the right outer module 60b along the ground surface. For example, coasters 66b allow for smooth, efficient movement of right outer module 60b along the ground surface when moving trailer 12 between the tow position and the utility position.

In additional embodiments, trailer assembly 10 includes a left table 92a and a right table 92b. When trailer 12 is in the tow position, as shown in FIGS. 1-3, left table 92a is removably secured to an outer surface 54a of left inner module 50a and an outer surface 68a of left outer module 60a. One of ordinary skill will understand that left table 92a may be secured to outer surface 54a and outer surface 68a by various configurations known in the art for securing objects to one another including, without limitation, a snap ring and lock configuration. For example, in some embodiments, outer surface 54a and outer surface 68a include receiving slots or channels, not shown, for receiving and retaining left table 92a while trailer 12 is in the tow position. Left table 92a cooperates with left inner module 50a and left outer module 60a to provide rigidity to trailer 12 while trailer 12 is in the tow position. When trailer 12 is in the utility position, or in the process of moving to the utility position, as shown in FIGS. 4, 6, and 7, left table 92a is removed and set up to provide additional preparation and serving space at on-location sites. When trailer 12 is in the tow position, as shown in FIGS. 1-3, right table 92b is removably secured to an outer surface 54b of right inner module 50b and an outer surface 68b of right outer module 60b. One of ordinary skill will understand that right table 92b may be secured to outer surface 54b and outer surface 68b by various configurations known in the art for securing objects to one another including, without limitation, a snap ring and lock configuration. For example, in some embodiments, outer surface 54b and outer surface 68b include receiving slots or channels, not shown, for receiving and retaining right table 92b while trailer 12 is in the tow position. Right table 92b cooperates with right inner module 50b and right outer module 60b to provide rigidity to trailer 12 while trailer 12 is in the tow position. When trailer 12 is in the utility position, or in the process of moving to the utility position, as shown in FIGS. 4, 6, and 7, right table 92b is removed and set up to provide additional preparation and servicing space at on-location sites.

In some embodiments, as depicted in FIGS. 6 and 7, trailer assembly 10 includes a canopy 94. A top surface 56a of left inner module 50a and a top surface 69a of left outer module 60a include a first set of one or more canopy slots 95a. A top surface 56b of right inner module 50b and a top surface 69b of right outer module 60b includes a second set of one or more canopy slots 95b. Canopy slots 95a and canopy slots 95b are configured to receive and retain a portion of canopy 94 such that canopy 94 is maintained in an upright position. When trailer 12 is in the utility position, canopy slots 95a and canopy slots 95b receive and retain canopy 94 which provides shade and cover from various elements, such as rain or snow, to the space defined when the left swivel plate 40a and the right swivel plate 40b are in the opened position. When trailer 12 is in the tow position, canopy 94 stores within one of compartments 52, compartments 52b, compartments 67a, and/or compartments 67b.

In other embodiments, as depicted in FIG. 4, trailer assembly 12 includes a first snap ring 96a, second snap ring 96b, and a removable cable 98. First snap ring 96a secures to a distal end of left outer module 60a away from left inner module 50a. Second snap ring 96b secures to a distal end of right outer module 60b away from right inner module 50b. Removable cable 98 removably secures to first snap ring 96a and second snap ring 96b. When secured to first snap ring 96a and second snap ring 96b, removable cable 98 restricts full outward movement of left outer module 60a and right outer module 60b when left swivel plate 40a and right swivel plate 40b are moved to the opened position.

Left axle assembly 70a comprises a left wheel assembly 72a and a left actuator 76a. Left axle assembly 70a connects to left swivel plate 40a and is movable between a rolling position and an angled position. The rolling position prevents movement of left swivel plate 40a with the left wheel assembly 72a in a forward facing configuration. The angled position allows movement of left swivel plate 40a between the opened position and the closed position. Left actuator 76a is configured to move left wheel assembly 72a between the rolling position and the angled position. For example, in some embodiments, as shown in FIG. 4, when in the angled position, left actuator 76a has positioned left wheel assembly 72a such that left wheel assembly 72a angles outward at about a forty-five degree angle. One of ordinary skill will understand that left actuator 76a may adjust left wheel assembly 72a to any angle sufficient to allow movement of left wheel axle assembly 70a between the rolling position and the angled position. Left actuator 76a may be a hydraulic ram, as depicted in FIG. 5, a screw, or a manually actuated lever. One of ordinary skill will understand that a variety of actuators known in the art may be used for left actuator 76a. As shown in FIG. 5, left actuator 76a is a hydraulic ram. A common hydraulic pump, and the necessary lines for connecting the hydraulic pump to the hydraulic ram, are contained in left inner module 50a or left outer module 60a or are carried by left swivel plate 40a.

In some embodiments, as more specifically depicted in FIG. 5, left axle assembly 70a includes left actuator mount 74a and left pin 78a. Left actuator mount 74a connects to left wheel assembly 72a and provides a receiving cavity for left pin 78a. Left pin 78a secures and retains left actuator 76a to left actuator mount 74a to provide for actuation of left wheel assembly 72a. One skilled in the art will recognize that a plurality of options are available for connecting left actuator 76a to left wheel assembly 72a in accordance with this disclosure.

Right axle assembly 70b comprises a right wheel assembly 72b and a right actuator 76b and connects to right swivel plate 40b and is movable between a rolling position and an angled position. The rolling position prevents movement of right swivel plate 40b with the right wheel assembly 72b in a forward facing configuration. The angled position allows movement of right swivel plate 40b between the opened position and the closed position. Right actuator 76b is configured to move right wheel assembly 72b between the rolling position and the angled position. For example, in some embodiments, as shown in FIG. 4, when in the angled position, right actuator 76b has positioned right wheel assembly 72b such that right wheel assembly 72b angles outward at about a forty-five degree angle. One of ordinary skill will understand that right actuator 76b may adjust right wheel assembly 72b to any angle sufficient to allow movement of right wheel axle assembly 70b between the rolling position and the angled position. Right actuator 76b may be a hydraulic ram, as depicted in FIG. 5, a screw, or a manually actuated lever. One of ordinary skill will understand that a variety of actuators known in the art may be used for right actuator 76b. As shown in FIG. 5, right actuator 76b is a hydraulic ram. A common hydraulic pump, and the necessary lines for connecting the hydraulic pump to the hydraulic ram, are contained in right inner module 50b or right outer module 60b or are carried by right swivel plate 40b.

In some embodiments, as more specifically depicted in FIG. 5, right axle assembly 70b includes right actuator mount 74b and right pin 78b. Right actuator mount 74b connects to right wheel assembly 72b and provides a receiving cavity for right pin 78b. Right pin 78b secures and retains right actuator 76b to right actuator mount 74b to provide for actuation of right wheel assembly 72b. One skilled in the art will recognize that a plurality of options are available for connecting right actuator 76b to right wheel assembly 72b in accordance with this disclosure.

In other embodiments, as depicted in FIG. 1, trailer assembly 10 includes a control box 110. Control box 110 may include a power system 112. Power system 112 connects to each of left actuator 76a and right actuator 76b. Power system 112 supplies sufficient power to left actuator 76a and right actuator 76b so as to actuate movement of left axle assembly 70a and right axle assembly 70b between the rolling position and the angled position. Power system 112 may comprise electrical power to left actuator 76a and right actuator 76b or hydraulic power in the case of a hydraulic ram actuator. One of ordinary skill will understand that the configuration of power system 112 used will depend on the type of left actuator 76a and right actuator 76b.

In additional embodiments, power system 112 includes a controller 114. Controller 114 connects to power system 112. Controller 114 includes a switch suitable for controlling operation of left actuator 76a and right actuator 76b. The switch controls power from power system 112 and thus controls movement of left axle assembly 70a and right axle assembly 70b between the rolling position and the angled position.

Although the disclosed invention has been shown and described in detail with respect to a preferred embodiment, it will be understood by those skilled in the art that various changes in the form and detailed area may be made without departing from the spirit and scope of this invention as claimed. Thus, the present invention is well adapted to carry out the object and advantages mentioned as well as those which are inherent therein. While numerous changes may be made by those skilled in the art, such changes are encompassed within the spirit of this invention as defined by the appended claims.

What is claimed is:

1. A trailer assembly comprising:
a trailer having a utility position and a tow position;
a hitch assembly projecting outward from a base;
a left swivel plate and a right swivel plate pivotally mounted to the base, the left swivel plate and the right swivel plate each having an opened position and a closed position;
a left inner module, the left inner module carried by the left swivel plate such that the left inner module pivots with the left swivel plate when the left swivel plate is moved between the opened position and the closed position;
a right inner module, the right inner module carried by the right swivel plate such that the right inner module pivots with the right swivel plate when the right swivel plate is moved between the opened position and the closed position;
a left outer module pivotally connected to the left inner module;
a right outer module pivotally connected to the right inner module;
a left axle assembly connected to the left swivel plate, the left axle assembly movable between a rolling position and an angled position, the rolling position preventing movement of the left swivel plate and the angled position allowing movement of the left swivel plate between the opened position and the closed position, wherein the left axle assembly comprises:
a left wheel assembly; and
a left actuator, the left actuator configured to actuate the left wheel assembly, wherein actuation of the left wheel assembly allows movement of the left axle assembly between the rolling position and the angled position; and
a right axle assembly connected to the right swivel plate, the right axle assembly movable between a rolling position and an angled position, the rolling position preventing movement of the right swivel plate and the angled position allowing movement of the right swivel plate between the opened position and the closed position, wherein the right axle assembly comprises:
a right wheel assembly; and
a right actuator, the right actuator configured to actuate the right wheel assembly, wherein actuation of the right wheel assembly allows movement of the right axle assembly between the rolling position and the angled position.

2. The trailer assembly of claim 1, the left swivel plate further comprising a first upper plate and a first lower plate, wherein the base is secured between the first upper plate and the first lower plate, and the right swivel plate further comprising a second upper plate and a second lower plate, wherein the base is secured between the second upper plate and the second lower plate.

3. The trailer assembly of claim 2 further comprising:
a left support beam secured between the first upper plate and the first lower plate, the left support beam having a retracted position and an extended position, wherein when the left support beam is in the extended position, the left support beam engages and supports the left outer module; and
a right support beam secured between the second upper plate and the second lower plate, the right support beam having a retracted position and an extended position, wherein when the right support beam is in the extended position, the right support beam engages and supports the right outer module.

4. The trailer assembly of claim 1 further comprising:
a left support beam secured between the left swivel plate and the left inner module, the left support beam having a retracted position and an extended position, wherein when the left support beam is in the extended position, the left support beam engages and supports the left outer module; and
a right support beam secured between the right swivel plate and the right inner module, the right support beam having a retracted position and an extended position, wherein when the right support beam is in the extended position, the right support beam engages and supports the right outer module.

5. The trailer assembly of claim 1, wherein the hitch assembly further comprises a telescoping support arm movable between a first position and a second position, wherein in the first position the telescoping support arm has a length sufficient to contact a ground surface.

6. The trailer assembly of claim 5 further comprising a handle connected to the telescoping support arm, wherein manipulation of the handle moves the telescoping support arm between the first position and the second position.

7. The trailer assembly of claim 1, the left outer module having a bottom surface, the bottom surface having one or more support legs, and the right outer module having a bottom surface, the bottom surface having one or more support legs, wherein the one or more support legs of the left outer module and the one or more support legs of the right outer module are each movable between an extended position and a retracted position, and wherein in the extended position the one or more support legs of the left outer module and the one or more support legs of the right outer module have a length sufficient to contact a ground surface.

8. The trailer assembly of claim 7, the bottom surface of the left outer module having one or more receiving slots, and the bottom surface of the right outer module having one or more receiving slots, wherein the one or more receiving slots of the left outer module receive and retain the one or more support legs of the left outer module when the one or more support legs of the left outer module are in the retracted position, and wherein the one or more receiving slots of the right outer module receive and retain the one or more support legs of the right outer module when the one or more support legs of the right outer module are in the retracted position.

9. The trailer assembly of claim 8 further comprising:
a first set of one or more coasters secured to a bottom surface of the one or more retractable legs of the left outer module; and
a second set of one or more coasters secured to a bottom surface of the one or more retractable legs of the right outer module, wherein when the one or more retractable legs of the left outer module and the one or more legs of the right outer module are in the extended position, the first set of one or more coasters and the second set of one or more coasters allow movement of the left outer module and the right outer module along the ground surface.

10. The trailer assembly of claim 1 further comprising:
one or more compartments within the left inner module and one or more compartments within the left outer module, wherein the one or more compartments within the left inner module and the one or more compartments within the left outer module are accessible when the left swivel plate is in the opened position; and one or more compartments within the right inner module and one or more compartments within the right outer module, wherein the one or more compartments within the right inner module and the one or more compartments within the right outer module are accessible when the right swivel plate is in the opened position.

11. The trailer assembly of claim 1 further comprises:

a first recessed hinge, the first recessed hinge providing the pivotal connection between the left inner module and the left outer module, wherein the first recessed hinge allows movement of the left outer module from a first position to a second position relative to the left inner module, when in the first position the left outer module shares a common longitudinal axis with the left inner module when the trailer is in the tow position and when in the second position the left outer module is askew to the left inner module when the trailer is in the utility position; and a second recessed hinge, the second recessed hinge providing the pivotal connection between the right inner module and the right outer module, and wherein the second recessed hinge allows movement of the right outer module from a first position to a second position relative to the right inner module, when in the first position the right outer module shares a common longitudinal axis with the right inner module when the trailer is in the tow position and when in the second position the right outer module is askew to the right inner module when the trailer is in the utility position.

12. The trailer assembly of claim 1 further comprising a left table removably secured to an outer surface of the left inner module and an outer surface of the left outer module, and a right table removably secured to an outer surface of the right inner module and an outer surface of the right outer module, wherein the left table cooperates with the left inner module and the left outer module and the right table cooperates with the right inner module and the right outer module to provide rigidity to the trailer when the trailer is in the tow position.

13. The trailer assembly of claim 1 further comprising a canopy, wherein the left inner module and the left outer module each have a top surface with a first set of one or more canopy slots, and the right inner module and the right outer module each have a top surface with a second set of one or more canopy slots, the first set of one or more canopy slots and the second set of one or more canopy slots configured to receive the canopy, wherein the canopy is configured to provide cover to a space defined when the left swivel plate and the right swivel plate are in the opened position.

14. The trailer assembly of claim 1 further comprising:

a first snap ring secured to a distal end of the left outer module away from the left inner module;

a second snap ring secured to a distal end of the right outer module away from the right inner module; and a removable cable, the removable cable removably secured to the first snap ring and the second snap ring, wherein when the removable cable is secured to the first snap ring and the second snap ring, the removable cable restricts full outward movement of the left outer module and the right outer module when the left swivel plate and the right swivel plate are moved to the opened position.

15. The trailer assembly of claim 1, wherein the left actuator and the right actuator are selected from the group consisting of a hydraulic ram, a screw, or a manually actuated lever.

16. The trailer assembly of claim 1 further comprising a power system connected to each of the left actuator and the right actuator, the power system supplying sufficient power to the left actuator and to the right actuator so as to actuate movement of the left axle assembly and the right axle assembly between the rolling position and the angled position.

17. The trailer assembly of claim 16 further comprising a controller connected to the power system, the controller having a switch suitable for controlling operation of movement of the left axle assembly and the right axle assembly between the rolling position and the angled position when moved between the off position and the on position.

18. The trailer assembly of claim 1, wherein when the left axle assembly is in the angled position the left wheel assembly angles outward at about a forty-five degree angle, and when the right axle assembly is in the angled position the right wheel assembly angles outward at about a forty-five degree angle.

19. A trailer assembly comprising:

a trailer having a utility position and a tow position;

a hitch assembly projecting outward from a base;

a left swivel plate and a right swivel plate pivotally mounted to the base, the left swivel plate and the right swivel plate each having an opened position and a closed position;

a left inner module, the left inner module carried by the left swivel plate such that the left inner module pivots with the left swivel plate when the left swivel plate is moved between the opened position and the closed position;

a right inner module, the right inner module carried by the right swivel plate such that the right inner module pivots with the right swivel plate when the right swivel plate is moved between the opened position and the closed position;

a left outer module pivotally connected to the left inner module;

a right outer module pivotally connected to the right inner module;

one or more compartments within the left inner module and one or more compartments within the left outer module, wherein the one or more compartments within the left inner module and the one or more compartments within the left outer module are accessible when the left swivel plate is in the opened position;

one or more compartments within the right inner module and one or more compartments within the right outer module, wherein the one or more compartments within the right inner module and the one or more compartments within the right outer module are accessible when the right swivel plate is in the opened position;

a left axle assembly connected to the left swivel plate, the left axle assembly movable between a rolling position and an angled position, the rolling position preventing movement of the left swivel plate and the angled position allowing movement of the left swivel plate between the opened position and the closed position, wherein the left axle assembly comprises:

a left wheel assembly; and a left actuator, the left actuator configured to actuate the left wheel assembly, wherein actuation of the left wheel assembly allows movement of the left axle assembly between the rolling position and the angled position; and a right axle assembly connected to the right swivel plate, the right axle assembly movable between a rolling position and an angled position, the rolling position preventing movement of the right swivel plate and the angled position allowing movement of the right swivel plate between the opened position and the closed position, wherein the right axle assembly comprises:

a right wheel assembly; and a right actuator, the right actuator configured to actuate the right wheel assembly, wherein actuation of the right wheel assembly allows movement of the right axle assembly between the rolling position and the angled position.

20. The trailer assembly of claim 19, wherein a first recessed hinge provides the pivotal connection between the left inner module and the left outer module, and wherein the first recessed hinge allows movement of the left outer module from a first position to a second position relative to the left inner module, when in the first position the left outer module shares a common longitudinal axis with the left inner module when the trailer is in the tow position and when in the second position the left outer module is askew to the left inner module when the trailer is in the utility position, and wherein a second recessed hinge provides the pivotal connection between the right inner module and the right outer module, and wherein the second recessed hinge allows movement of the right outer module from a first position to a second position relative to the right inner module, when in the first position the right outer module shares a common longitudinal axis with the right inner module when the trailer is in the tow position and when in the second position the right outer module is askew to the right inner module when the trailer is in the utility position.

* * * * *